United States Patent
Francis et al.

(10) Patent No.: US 6,746,781 B2
(45) Date of Patent: Jun. 8, 2004

(54) GYPSUM BOARD HAVING POLYVINYL ALCOHOL BINDER IN INTERFACE LAYER AND METHOD FOR MAKING THE SAME

(75) Inventors: Hubert C. Francis, Lithonia, GA (US); Anne H. Ksionzyk, Decatur, GA (US); Fabio E. Esguerra, Covington, GA (US)

(73) Assignee: G-P Gypsum Corporation, Atlanta, GA (US)

( * ) Notice: Subject to any disclaimer, the term of this patent is extended or adjusted under 35 U.S.C. 154(b) by 15 days.

(21) Appl. No.: 10/224,591

(22) Filed: Aug. 21, 2002

(65) Prior Publication Data

US 2004/0038065 A1 Feb. 26, 2004

(51) Int. Cl.$^7$ .............................................. B32B 29/00
(52) U.S. Cl. ................. 428/537.5; 428/537.7; 427/393.6; 427/389.8
(58) Field of Search .......................... 428/537.5, 537.7; 427/389.8, 393.6; 296/37.6

(56) References Cited

U.S. PATENT DOCUMENTS

| | | | |
|---|---|---|---|
| 3,853,689 A | 12/1974 | Morrone | |
| 4,518,652 A | 5/1985 | Willoughby | |
| 4,548,676 A | 10/1985 | Johnstone et al. | |
| 4,647,496 A * | 3/1987 | Lehnert et al. | 442/386 |
| 4,810,569 A | 3/1989 | Lehnert et al. | |
| 4,811,538 A | 3/1989 | Lehnert et al. | |
| 4,879,173 A * | 11/1989 | Randall | 442/86 |
| 5,116,671 A | 5/1992 | Bruce et al. | |
| 5,148,645 A | 9/1992 | Lehnert et al. | |
| 5,220,762 A | 6/1993 | Lehnert et al. | |
| 5,319,900 A | 6/1994 | Lehnert et al. | |
| 5,342,680 A | 8/1994 | Randall | |
| 5,371,989 A | 12/1994 | Lehnert et al. | |
| 5,552,187 A * | 9/1996 | Green et al. | 427/389.8 |
| 5,644,880 A * | 7/1997 | Lehnert et al. | 52/408 |
| 5,704,179 A | 1/1998 | Lehnert et al. | |
| 5,718,785 A | 2/1998 | Randall | |
| 5,718,797 A | 2/1998 | Phillips et al. | |
| 5,791,109 A | 8/1998 | Lehnert et al. | |
| 5,883,024 A | 3/1999 | O'Haver-Smith et al. | |
| 5,981,406 A | 11/1999 | Randall | |
| 6,001,496 A | 12/1999 | O'Haver-Smith | |
| 6,485,821 B1 * | 11/2002 | Bruce et al. | 428/304.4 |

* cited by examiner

*Primary Examiner*—Leszek Kiliman
(74) *Attorney, Agent, or Firm*—Banner & Witcoff, Ltd.

(57) ABSTRACT

Paper and/or mat-faced gypsum board is prepared by applying a relatively thin coating of aqueous gypsum slurry containing a polyvinyl alcohol binder to one or two facer sheets. The polyvinyl alcohol binder provides adequate adhesion between the set gypsum core and the adjacent facer sheet(s) without the need for starch or other conventional binders. In one embodiment, polyvinyl alcohol is concentrated in one or more regions of the core adjacent to the facer sheet(s). In another embodiment, polyvinyl alcohol is applied to an aqueous gypsum slurry used to form the bulk core, such that the polyvinyl alcohol is present throughout the core.

23 Claims, 2 Drawing Sheets

GYPSUM BOARD HAVING POLYVINYL ALCOHOL BINDER IN INTERFACE LAYER AND METHOD FOR MAKING THE SAME

FIELD OF THE INVENTION

The present invention relates to gypsum boards and, more particularly, to gypsum boards having paper and/or fibrous mat facers adhered to a set gypsum core.

BACKGROUND OF THE INVENTION

Panels of gypsum wallboard having a core of set gypsum sandwiched between two sheets of facing paper have long been used as structural members in the fabrication of buildings. Such panels are typically used to form the partitions or walls of rooms, elevator shafts, stairwells, ceilings and the like. Paper facing provides a smooth surface that is especially desirable for painting or wall papering interior walls. Although paper is a relatively inexpensive facing material and is easily used in the process of manufacturing wallboard, it has certain disadvantages, particularly with regard to moisture-resistance. As an alternative to paper facing, a fibrous mat (such as glass fiber) has been used as a facing material for gypsum wallboard. One example of such a wallboard is described in U.S. Pat. No. 3,993,822. Fibrous matting provides improved water resistance and often provides significant improvements in strength and other structural attributes. More recently, fibrous mats having various types of coatings also have found acceptance for use in applications requiring moisture resistance. See, for example, U.S. Pat. No. 5,552,187 and U.S. application Ser. No. 09/837,226, now Published Application No. U.S. 2002/0155282 A1.

Gypsum board is typically manufactured by a method which includes dispersing a gypsum slurry onto a moving sheet of facer. The facer typically is supported by equipment such as forming tables, support belts, carrier rolls and/or the like. A second sheet of facer is then fed from a roll onto the top of the slurry, thereby sandwiching the slurry between two moving facers. Forming or shaping equipment is utilized to compress the slurry to the desired thickness. The gypsum slurry is allowed to at least partially set and then sequential lengths of board are cut and further processed by exposure to heat, which accelerates the drying of the board by increasing the rate of evaporation of excess water from the gypsum slurry.

The composition from which the set gypsum core of the structural panel is made can include a variety of additives, such as set accelerators, set retardants, foaming agents, reinforcing fibers, and dispersing agents. In addition, a viscosity control agent may be added to adjust the viscosity of the slurry.

Examples of viscosity control agents are described in U.S. Pat. No. 4,647,496. Other typical additives include water-resistant additives and fire-resistant additives. A variety of additives for improving water-resistant properties of a gypsum core is described, for example, in U.S. Pat. No. 5,342,680, including a mixture of polyvinyl alcohol and a wax-asphalt emulsion.

To reduce the weight (density) of the core, it has been common practice to introduce small bubbles into the gypsum to produce a foamed gypsum core.

Foaming agents or soaps, typically long-chained alkyl sulfonates, are conventionally added for this purpose. One adverse consequence of the normal addition of soaps into gypsum slurry is a reduction in the strength of the bond between the cured gypsum core and the paper facers. To counteract this effect, a starch binder normally is added to the gypsum slurry.

U.S. Pat. No. 4,518,652 to Willoughby describes preparing a set cementitious product, such as paper-faced gypsum wallboard, in which polyvinyl alcohol is used as a foaming agent. During manufacture, a foamed solution of polyvinyl alcohol is introduced into the aqueous calcined gypsum slurry. The process is said to avoid the need for conventional detergents or soaps as foaming agents, while providing good adhesion between the paper cover sheets and the gypsum core. However, in the examples starch is added in the gypsum core and apparently is needed to obtain adequate adhesion to the paper facer sheets.

It would be desirable to develop a lightweight gypsum board that is free or substantially free of starch and yet has adequate adhesion properties between the core and paper and/or fibrous mat facers, especially coated fibrous mats.

SUMMARY OF THE INVENTION

One aspect of the present invention is directed to a process of preparing a gypsum board having adequate adhesion between a set gypsum core and at least one adjacent facer sheet. A relatively thin coating of an aqueous slurry of calcined gypsum containing an adhesion promoting effective amount of polyvinyl alcohol is applied to a first side of a first facer sheet. A relatively thin coating of aqueous gypsum slurry containing an adhesion promoting effective amount of polyvinyl alcohol optionally is applied to a first side of a second facer sheet. An aqueous slurry of calcined gypsum is applied to the first or second facer sheet to form the core of the board. The first and second facer sheets are pressed together to form a wet board, and the wet board is dried to form a gypsum board.

Another aspect of the present invention is directed to a gypsum board having adequate adhesion between a set gypsum core and adjacent facer sheets without the need for starch or other conventional binders. The gypsum board comprises a set gypsum core containing an adhesion promoting effective amount of polyvinyl alcohol, a first facer sheet adhered to a first surface of the set gypsum core, and a second facer sheet adhered to a second surface of the set gypsum core. The set gypsum core is free or substantially free of starch.

In one preferred embodiment, the polyvinyl alcohol is concentrated near that portion of the set gypsum core adjacent to the facer sheet(s) and is not present in the center of the set gypsum core.

The present invention provides an economical, lightweight gypsum board having good adhesion properties between the gypsum core and the adjacent facer sheets without the need for starch or other conventional binders, thereby overcoming certain drawbacks associated with presently available gypsum board technologies.

BRIEF DESCRIPTION OF THE DRAWINGS

The objects, features, and advantages of the invention will be apparent from the following more detailed description of certain embodiments of the invention and as illustrated in the accompanying drawings in which.

DETAILED DESCRIPTION OF THE INVENTION

Figure 1:
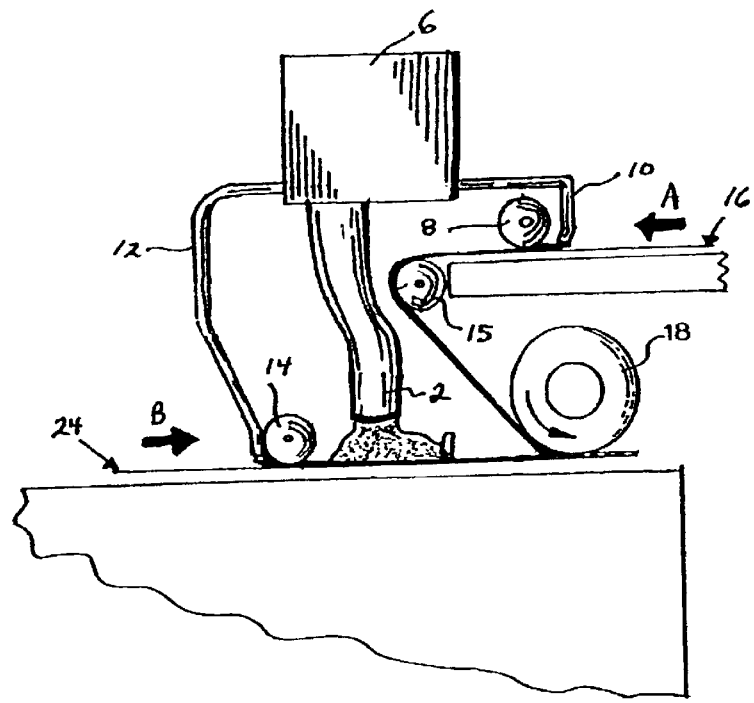
FIG. 1 is a partial schematic view of a process of preparing gypsum board having a polyvinyl alcohol binder-containing interface layer in accordance with one embodiment of the present invention.

The gypsum core of the wallboard of the present invention is basically of the type used in gypsum structural products commonly known as gypsum wallboard, dry wall, gypsum board, gypsum lath and gypsum sheathing. The core of such a product is formed by mixing water with powdered anhydrous calcium sulfate or calcium sulfate hemi-hydrate ($CaSO_4 \cdot \frac{1}{2}H_2O$), also known as calcined gypsum, to form an aqueous gypsum slurry, and thereafter allowing the slurry mixture to hydrate or set into calcium sulfate dihydrate ($CaSO_4 \cdot 2H_2O$), a relatively hard material. The core of the product will in general comprise at least about 75–85 wt % of set gypsum, though the invention is not limited to any particular content of gypsum in the core.

The composition from which the set gypsum core of the structural panel is made can include a variety of optional additives, including, for example, those long included conventionally in gypsum wallboard. Non-limiting examples of such additives include set accelerators, set retarders, foaming agents, reinforcing fibers, fungicides, and dispersing agents. The gypsum core should be free or substantially free of starch. To improve the water-resistant properties of the core, the gypsum composition from which the core is made may also include one or more additives to improve the ability of the set gypsum composition to resist being degraded by water (for example, to resist dissolution). In one embodiment, the water-resistance of the wallboard is such that it absorbs less than about 10%, preferably less than about 7.5%, and most preferably less than about 5% water when tested in accordance with the immersion test of ASTM method C-473.

A key feature of the present invention is its ability to provide adequate adhesive bond strength between the paper and/or fibrous mat facer(s), especially coated fibrous mats, and the set gypsum core without using starch. As used herein the phrase "free or substantially free of starch" means that the amount of starch in the set gypsum core is below the amount of starch that would be needed to enhance the bond between the set gypsum core and the facer(s). In other words, any starch that might be present in the core is not needed or effective for promoting adhesion between the facer(s) and the set gypsum core. Preferably, there is no starch in the core.

Wallboards for interior use may contain wax or a wax emulsion as an additive to improve the water resistance of the gypsum core. The invention is not limited thereby, however, and examples of other materials which have been reported as being effective for improving the water-resistant properties of gypsum products include metallic resinates; wax or asphalt or mixtures thereof, usually supplied as an emulsion; a mixture of wax and/or asphalt and also cornflower and potassium permanganate; water insoluble thermoplastic organic materials such as petroleum and natural asphalt, coal tar, and thermoplastic synthetic resins such as poly(vinyl acetate), poly(vinyl chloride) and a copolymer of vinyl acetate and vinyl chloride and acrylic resins; a mixture of metal rosin soap, a water soluble alkaline earth metal salt, and residual fuel oil; a mixture of petroleum wax in the form of an emulsion and either residual fuel oil, pine tar or coal tar; a mixture comprising residual fuel oil and rosin; aromatic isocyanates and diisocyanates; organohydrogenpolysiloxanes; siliconates, such as available from Dow Corning as Dow Corning 772; a wax emulsion and a wax-asphalt emulsion each with or without such materials as potassium sulfate, alkali and alkaline earth aluminates, and Portland cement; a wax-asphalt emulsion prepared by adding to a blend of molten wax and asphalt an oil-soluble, water-dispersing emulsifying agent, and admixing the aforementioned with a solution of casein which contains, as a dispersing agent, an alkali sulfonate of a polyarylmethylene condensation product. The siliconates are normally used in an amount of from about 0.05% to about 0.4%, more usually in an amount of about 0.1%. Mixtures of these additives can also be employed.

Species of wax emulsions and wax-asphalt emulsions used to improve wallboard water resistance are commercially available. The wax portion of these emulsions is preferably a paraffin or microcrystalline wax, but other waxes also can be used. If asphalt is used, it in general should have a softening point of about 115° F., as determined by the ring and ball method. The total amount of wax and wax-asphalt in the aqueous emulsions will generally comprise about 50 to about 60 wt % of the aqueous emulsion. In the case of wax-asphalt emulsions, the weight ratio of asphalt to wax usually varies from about 1 to 1 to about 10 to 1. Various methods are known for preparing wax-asphalt emulsions, as reported in U.S. Pat. No. 3,935,021. Commercially available wax emulsions and wax-asphalt emulsions that can be used in the gypsum composition described herein have been sold by United States Gypsum Co. (Wax Emulsion), by Monsey Products (No. 52 Emulsion), by Douglas Oil Co. (Docal No. 1034), by Conoco (No. 7131 and Gypseal II) and by Monsey-Bakor (Aqualite 70). The amount of wax emulsion or wax-asphalt emulsion used to provide water resistant characteristics to the gypsum core often can be within the range of about 3 to about 10 wt %, preferably about 5 to about 7 wt %, based on the total weight of the ingredients of the composition from which the set gypsum core is made.

Another water-resistant additive for use in the core of the gypsum-based core is an organopolysiloxane, for example, of the type referred to in U.S. Pat. Nos. 3,455,710; 3,623, 895; 4,136,687; 4,447,498; and 4,643,771. One example of this type of additive is poly(methyl-hydrogen-siloxane). When used, the amount of the organopolysiloxane usually is at least about 0.2 wt % and often falls within the range of about 0.3 to about 0.6 wt %.

Unless stated otherwise, the term "wt %" as used herein in connection with the gypsum core means weight percent based on the total weight of the ingredients of the composition from which the set gypsum core is made, including any water of the wax or wax-asphalt emulsion, but not including additional amounts of water that are added to the gypsum composition for forming an aqueous slurry thereof.

In accordance with the present invention, polyvinyl alcohol is used as a binder in an effective amount to promote adhesion between the set gypsum core and the adjacent facer sheet(s), avoiding the need to use in the gypsum core starch or other conventional binders. The source of the polyvinyl alcohol preferably is more than 95% hydrolyzed and more preferably is a substantially completely hydrolyzed form of polyvinyl acetate, i.e., about 97 to 100% hydrolyzed polyvinyl acetate. The polyvinyl alcohol should be cold-water insoluble, but soluble in water at elevated temperatures, for example, at temperatures of about 140° to about 205° F. In general, a 4 wt % water solution of a polyvinyl alcohol suitable for use in the invention will have a viscosity of about 25 to 70 cp at 20° C. as determined by means of the Hoeppler falling ball method. Polyvinyl alcohols are commercially available, such as from E. I. du Pont de Nemours and Company, sold under the trademark "Elvanol," and previously from Monsanto Co., sold under the trademark "Gelvatol." Examples of such prior-available products are Elvanol, Grades 71-30, 72-60, and 70-05, and Gelvatol, Grades 1-90, 3-91, 1-60, and 3-60. Air Products Corp. also has sold a product identified as WS-42. A preferred polyvinyl alcohol for use in the invention is sold by Celanese Chemicals under the trade name Celvol™ 203-24.

Typically, the core of the gypsum board has a density of about 35 to about 55 lbs./ft$^3$, more usually about 40 to about 50 lbs./ft$^3$. Of course, cores having both higher and lower densities can be used in particular applications if desired. The manufacture of cores of predetermined densities can be accomplished by using known techniques, for example, by introducing an appropriate amount of foam (soap) into the aqueous gypsum slurry from which the core is formed or by molding.

Figure 2:
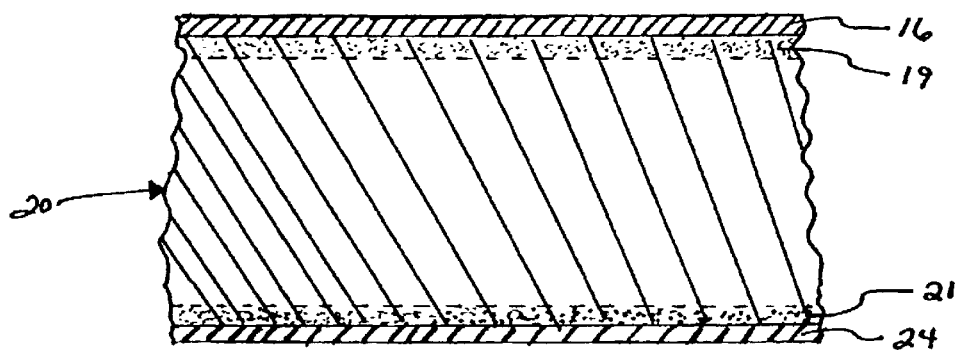
FIG. 2 is a schematic illustration of a gypsum board having a gypsum core that contains polyvinyl alcohol in regions of the core adjacent to first and second facer sheets in accordance with one embodiment of the present invention.

Gypsum board can be prepared in accordance with either of two embodiments of the present invention. In a first embodiment as illustrated in FIG. 1, a relatively thin coating of aqueous calcined gypsum slurry containing polyvinyl alcohol is applied to either or both facers. An aqueous slurry of gypsum (which usually does not contain polyvinyl alcohol) is applied to one of the facers to form the core. The facers are then sandwiched together to form a wet board. The resulting board contains polyvinyl alcohol in regions of the core adjacent to the facer sheet(s), as illustrated in FIG. 2. In a second embodiment, an aqueous calcined gypsum slurry containing polyvinyl alcohol is applied to one facer, and a second facer is contacted with the slurry to sandwich the slurry between the two facers. In this embodiment, the resulting board contains polyvinyl alcohol throughout the set gypsum core.

In the first embodiment in which a relatively thin coating containing polyvinyl alcohol is applied to one or both facers, the amount of polyvinyl alcohol present in the gypsum slurry should be at least a minimum amount to promote adhesion between the set core and the paper and/or mat facer sheets, preferably avoiding the need for starch or other conventional binders. Suitable exemplary amounts of polyvinyl alcohol in the slurry range from about 0.05 to about 0.4 wt % on a dry weight basis, and the amount more usually ranges from about 0.1 to about 0.3 wt %.

The gypsum board of the present invention is faced with first and second facer sheets. Each of the facer sheets can be a paper facer sheet or a fibrous mat facer, preferably a coated fibrous mat. Thus, the gypsum board can have, by way of example, a set gypsum core covered by two paper facers, two fibrous mat facers, or one paper facer and one fibrous mat facer. Preferably, polyvinyl alcohol is used as a binder at least in slurries applied to paper facer sheets, and also may be used in slurries applied to fibrous mat facers, especially coated fibrous mat facers, if needed or desired. The terms "first facer" and "second facer" are arbitrary in that each term can refer either to a top layer or a backing layer.

Suitable paper facer sheets include those commonly used for the face sheet of wallboard products. Such paper products are well known to those skilled in the art. One example of a paper facer sheet suitable for interior finishing applications is an ivory paper (multi-ply) having hard internal sizing (100% through) of 1000 to 3500; a basis weight of about 54 to 56 pounds per 1000 square feet; an overall caliper of about 0.013 inches; a tensile strength of about 70 lbs/inch (machine direction) and about 23 lbs/inch (cross direction); a top liner Cobb surface wetting of about 1.00 to about 1.50 grams and bottom liner Cobb surface wetting of about 0.50 to about 1.50 grams; and a porosity of about 15 sec. to about 150 sec. Other papers suitable for interior finishing or for the backside of the wallboard (adjacent to the studs) are well known to those skilled in the art.

When a fibrous mat is used for either or both facer sheets, the mat preferably is coated to make it resistant to moisture, preferably essentially impervious to liquid water. Such a coating should be sufficiently porous, however, to permit water in the aqueous gypsum slurry from which the gypsum core is made to evaporate in its vaporous state therethrough during manufacture of the board. The coated fibrous mat can be prepared in advance and the pre-coated fibrous mat is used in fabricating board. Alternatively, the fibrous mat may be coated after fabrication of the board or may be coated both before and after fabrication. Non-exclusive, though preferred, examples of possible coatings are described in U.S. Pat. No. 5,112,678 and application Ser. No. 09/837,226, entitled "Mat-Faced Gypsum Board," now Published Application No. U.S. 2002/0155282 A1, both of which are incorporated herein by reference.

Fibrous mats should contain fibrous material that is capable of forming a strong bond with the set gypsum comprising the core of the gypsum board.

Examples of such materials include (1) a mineral-type material such as glass fibers, (2) synthetic resin fibers and (3) mixtures of such fibers. Glass fiber mats are preferred, especially those that are pre-coated before board manufacture as referenced above. The mat can comprise continuous or discrete strands or fibers and can be woven or nonwoven in form. Nonwoven mats such as made from chopped strands and continuous strands can be used satisfactorily and are less costly than woven materials. The strands of such mats typically are bonded together to form a unitary structure by a suitable adhesive. The fiber mat can range in thickness, for example, from about 10 to about 40 mils, with a mat thickness of about 15 to about 35 mils generally being suitable. The aforementioned fibrous mats are known and are commercially available in many forms.

One suitable fibrous mat is a fiberglass mat comprising chopped, nonwoven, fiberglass filaments oriented in a random pattern and bound together with a resin binder, typically a urea-formaldehyde resin adhesive. Fiber glass mats of this type are commercially available, for example, such as those which have been sold under the trademark DURA-GLASS by Manville Building Materials Corporation and those which have been sold by Elk Corporation as BUR or shingle mat. An example of such a mat, which is useful in preparing a pre-coated mat for making gypsum board useful in structural building applications, is nominally 33 mils thick and incorporates glass fibers about 13 to 16 microns in diameter. Although certain structural applications may utilize a thicker mat and thicker fibers, a glass fiber mat nominally 20 mils thick, which includes glass fibers about 10 microns in diameter, is also suitable for use in the present invention. Mats suitable for use in the present invention have a basis weight which is usually between about 10 and 30 lbs. per thousand square feet of mat surface area.

Typically, but not exclusively, the glass fiber mats are wet-formed into a continuous non-woven web of any workable width on a Fourdrinier-type machine. Preferably, an upwardly inclining wire having several linear feet of very dilute stock lay-down, followed by several linear feet of high vacuum water removal, is used. This is followed by a "curtain coater," which applies the glass fiber binder and an oven that removes excess water and cures the adhesive to form a coherent mat structure.

Preferably, the fibrous mat is a pre-coated glass fiber mat, preferably a pre-coated mat wherein the outer surface of the mat is coated with a coating that comprises a mixture of predominately a mineral pigment (pigmented filler material), an inorganic binder and a latex polymer binder. In particular, the preferred coating comprises a dried (or cured) aqueous mixture of a mineral pigment; a first binder of a polymer latex adhesive and, a second binder of an inorganic adhesive. On a dry weight basis, the first polymer latex binder generally comprises no more than about 5.0% by weight of the coating, and the second inorganic binder generally comprises at least about 0.5% by weight, of the total weight of the dried (cured) coating.

A mineral pigment typically is the major component of the coating composition. Examples of mineral pigments suitable for making the preferred coated mats include, but are not limited to, ground limestone (calcium carbonate), clay, sand, mica, talc, gypsum (calcium sulfate dihydrate), aluminum trihydrate (ATH), antimony oxide, or a combination of any two or more of these substances. The mineral pigment is usually provided in a particulate form. To be an effective mineral pigment for making a coated mat, the pigment should have a particle size such that at least about 95% of the pigment particles pass through a 325 mesh wire screen. Such materials are collectively and individually referred to in the alternative as mineral pigments or as "fillers."

The second binder typically is an inorganic compound such as calcium oxide, calcium silicate, calcium sulfate, magnesium oxychloride, magnesium oxysulfate, or aluminum hydroxide. Alternatively, the second binder can be an inherent component in the mineral pigment component, as in the case wherein the mineral pigment includes aluminum trihydrate, calcium carbonate, calcium sulfate, magnesium oxide, or some clays and sands.

One example of a complex inorganic binder is common Portland cement, which is a mixture of various calcium-aluminum silicates. However, Portland cement cures by hydration, which can create a coating mixture with a short shelf life. Also, both the oxychloride and the oxysulfate of magnesium are complex inorganic binders, which cure by hydration. Coating formulations made with such inorganic adhesive binders must be used quickly or a tank containing the aqueous coating composition could set up in a short period of time.

The oxychlorides or oxysulfates of magnesium, aluminum hydroxide, and calcium silicate are only very slightly soluble in water, and are useful inorganic adhesive binders of this invention. Inorganic adhesive binders, which are quickly soluble in water, such as sodium silicate, may not be usable in coatings expected to be exposed to hot and/or high humid ambient conditions for long periods. One preferred inorganic adhesive binder for making a suitable coated mat is quicklime (CaO). Quicklime does not hydrate in a coating mix, but cures by slowly converting to limestone, using carbon dioxide from the air. Quicklime is not soluble in water.

Filler materials inherently containing some naturally occurring inorganic adhesive binder can be used to make the preferred coated mat. Examples of such fillers, some listed with the naturally occurring binder, include (but are not limited to) the following: limestone containing quicklime (CaO), clay containing calcium silicate, sand containing calcium silicate, aluminum trihydrate containing aluminum hydroxide, cementitious fly ash and magnesium oxide containing either the sulfate or chloride of magnesium, or both. Depending on its level of hydration, gypsum can be both a mineral pigment and an inorganic adhesive binder, but it is only slightly soluble in water, and the solid form is crystalline making it brittle and weak as a binder. As a result, gypsum is not generally preferred for use as the inorganic adhesive binder.

Fillers, which inherently include an inorganic adhesive binder as a constituent and which cure by hydration, also advantageously act as flame suppressants. As examples, aluminum trihydrate (ATH), calcium sulfate (gypsum), and the oxychloride and oxysulfate of magnesium all carry molecules of water bound into their molecular structure. This water, referred to either as water of crystallization or water of hydration, is released upon sufficient heating, actually suppressing flames.

Low cost inorganic mineral pigments such with the properties of those described in the preceding paragraph, thus, provide three (3) important contributions to the coating mixture: a filler; a binder; and, a fire suppressor. Examples of polymer latex binders used with the inorganic binders include, but are not limited to: styrene-butadiene-rubber, styrene-butadiene-styrene, ethylene-vinyl-chloride, polyvinylidene-chloride, modified polyvinyl chloride, polyvinyl alcohol, ethylene-vinyl-acetate, and polyvinyl acetate.

The ratio, by weight, of the mineral pigment to the polymer latex adhesive in the coating often is in excess of 15:1 and, in some cases, in excess of 20:1.

Suitable coating compositions for making coated mat may contain, on a dry weight basis, about 75 to 98 percent mineral pigment, more usually about 85 to 95 percent mineral pigment, about 0.5 to 20 percent inorganic adhesive, more usually about 0.5 to 10 percent and about 0.1 to 5 percent polymer latex adhesive, more usually about 1 to 5 percent.

In order for the pre-coated mat to be most useful in making the coated mat-faced gypsum board, it is preferred that the coated mat be flexible enough to be rolled up into rolls of continuous sheet. As a result, the coated mat should not be so stiff and brittle that it will break upon bending. To accomplish this objective, it appears that the inorganic adhesive binder content of the mat coating generally should not exceed about 20% by weight of the total dry weight of the coating, and usually is less than 10%. Likewise, the polymer latex binder has practical upper limits due to cost and a desire to limit the combustibility of the coating. No more than about 5.0% latex (dry weight basis) of the total dry weight of the coating appears necessary. Rolls of a coated glass fiber mat suitable for making the coated mat faced gypsum board of the present invention have been obtained from Atlas Roofing Corporation as Coated Glass Facer (CGF).

Any suitable method for applying an aqueous coating composition to a substrate can be used for making the coated mat. The coating composition can be applied by any suitable means to the fibrous mat, for example, spray, brush, curtain coating, and roller coating, the last mentioned being preferred.

The amount of coating applied to the surface of the fibrous mat should be sufficient to embed the surface of the mat completely in the coating, to the extent that substantially no fibers protrude through the coating. The amount of coating required is dependent upon the thickness of the mat. It is difficult to measure thickness of the coating because of the uneven nature of the fibrous mat substrate on which the coating is applied. In rough terms, the thickness of the coating should be at least about 10 mils, but when the glass mat is relatively thin and the coating is efficiently dried, a coating as thin as 4 mils may suffice. In general, the thickness need not exceed about 30 mils.

A coated glass fiber mat can be prepared by applying an aqueous coating composition containing the noted solid constituents to a fiber mat in an amount on a dry weight basis equivalent to at least about 50 lbs., more usually between about 60 and 120 lbs., per 1000 sq. ft. of mat. Normally, the dry coating is present in an amount equivalent to at least about 60 lbs., most often between about 80 and 100 lbs., per 1000 sq. ft. of mat, depending upon the thickness of the glass fiber mat. Using a glass fiber mat nominally 33 mils thick (made using fibers of about 16 microns), the amount of coating when dried should be equivalent to at least about 50 lbs., preferably about 100 lbs. per 1000 sq. ft. of mat surface area; using a fiber glass mat nominally 20 mils thick (made with fibers of about 10 microns), a lesser amount of coating may be used. Although higher or lower amounts of coating can be used in any specific case, it is believed that, for most applications, the amount of coating will fall within the range of about 50 to about 120 lbs per 1000 sq. ft. of mat (dry basis). In particularly preferred form, applied to 33 mil mat, the dry coating should weigh about 60 to about 80 or 100 lbs. per 1000 sq. ft. of board; applied to 20 mil mat, the dry coating may weigh about 80 lbs. per 1000 sq. ft.

Following application of the aqueous coating composition to the mat, the composition is dried (cured), usually by heat to form the coated mat. The coated mat made in accordance with these teachings is liquid impermeable, but does allow water vapor to pass through.

The fibrous mat also can be provided with a water-resistant coating of the type described in U.S. Pat. No. 5,397,631, either in lieu of, or in addition to the above-described coating. The disclosure of U.S. Pat. No. 5,397,631 is incorporated herein by reference. This coating can be applied onto the surface of the uncoated, or coated fibrous mat, either before of after it is bonded to the set gypsum core, as an aqueous coating composition comprising from about 15 to about 35 wt % of resin solids, about 20 to about 65 wt % of filler, and about 15 to about 45 wt % of water. One resin suitable for use in the coating composition is available in the form of a latex, as previously sold by Unocal Chemicals Division of Unocal Corporation under the mark 76 RES 1018. The pH and solids content of the latex are respectively 7.5–9.0 and 50%. The resin is a styrene-acrylic copolymer that has a relatively low film-forming temperature (20° C.) and a glass transition temperature, $T_g$ of 22° C. Coatings formed from the resin can be dried effectively at temperatures within the ranges of about 300 to 400° F. (150 to 205° C.). Another suitable resin for the coating is a poly(vinylidene) copolymer. Still another reinforcing resin binder suitable for use in this embodiment of the present invention also has been available in the form of a latex sold by Unocal Chemicals Division of Unocal Corporation— under the mark 76 RES 2302. The pH and solids content of the latex are, respectively, 3.5 and 45%. The resin is a self-crosslinking vinyl acetate-acrylic copolymer that has a Tg of about 33° C. Other suitable resins will be apparent to those skilled in the art. Examples of fillers that can be used in making the aqueous coating composition are silicates, silica, gypsum and calcium carbonate, the last mentioned being particularly preferred. Other conventional additives of the type generally used in latex paint compositions also can be added to this coating composition. In general, the total amount of such additives will be within the range of about 1 to about 5 wt. %. Examples of such additives include pigments, thickeners, defoamers, dispersants and preservatives.

While the fibrous mat facer usually is free of gypsum, it may be partially or completely coated with gypsum. Still other compositions for coating the fibrous mat will be apparent to those skilled in the art, and the present invention is not limited to any particular coated mat.

FIG. 1 is a schematic illustration of a portion of a manufacturing line for producing gypsum wallboard in accordance with one embodiment of the present invention. The specific details of such a configuration are conventional and thus are provided only by a schematic representation.

Dry ingredients from which the gypsum core is formed are pre-mixed and then fed to a mixer of the type commonly referred to as a pin mixer 6 through means not shown. Water and other liquid constituents used in making the core, including the polyvinyl alcohol binder, are metered into the pin mixer 6 through means not shown, where they are combined with the desired dry ingredients to form an aqueous gypsum slurry.

The pin mixer 6 illustrated in FIG. 1 has two discharge conduits 10, 12, for applying a relatively thin coating of the slurry to the first 16 and second 24 facers, respectively. Alternatively, separate mixers can be provided for preparing slurries for application to the two facer sheets. It may be desirable to provide separate mixers, for example, when different types of facer materials are used (e.g., one paper facer and one fibrous mat) which may require different amounts of the polyvinyl alcohol binder. The slurry is deposited through the first discharge conduit 10 onto the first facer 16, a horizontally moving continuous web, which is fed in the direction indicated by arrow A in FIG. 1, typically from a roll of material (not shown). The thickness of slurry deposited on the first facer 16 can be controlled by techniques well known in the art, shown schematically by roller 8.

In a similar fashion, the second discharge conduit 12 applies the slurry onto the second facer 24, a horizontally moving continuous web, which is fed in the direction indicated by arrow B in FIG. 1. The thickness of slurry deposited on the second facer 24 can be controlled by well known techniques, schematically illustrated by roller 14. The remainder of the core material is applied to the second facer 24 via an applicator 2. This gypsum slurry usually (but not necessarily) contains the same components in the same relative proportions as the polyvinyl alcohol-containing slurry, with the exception of polyvinyl alcohol. The slurry applied via applicator 2 may, but usually does not contain PVA.

FIG. 1 illustrates feeding the first 16 and second 24 facer webs in opposite directions, and inverting the first web 16 using a reversing roller 15 so that the slurry-coated surfaces of the webs 16, 24 oppose and abut each other with the core therebetween. The slurry-coated webs are then pressed together by roller 18 to form what is commonly referred to as a wet board. Various other configurations may be used for feeding and joining the webs, and the present invention should not be construed as being limited to any particular technique for feeding and joining the webs.

The total amount (thickness) of slurry applied to each web 16 and 24 most often ranges from about 75 to about 375 pounds per thousand square feet (lbs./MSF), more usually from about 90 to about 200 lbs./MSF. This amount typically represents from about 3 to 11% of the total gypsum slurry used to form the gypsum core.

Following initial hydration and ultimately aided by heating, excess water evaporates through the fibrous mat and/or paper as the calcined gypsum hydrates and sets. The resulting gypsum board is schematically illustrated in FIG. 2. The board has a set gypsum core 20 with the first 16 and second 24 facer sheets adhered thereto. The polyvinyl alcohol is concentrated in first 19 and second 21 regions of the core 20 that are adjacent to the first 16 and second 24 facer sheets, respectively. The remainder of the set gypsum core 20 generally does not contain polyvinyl alcohol. Generally, the core will have voids (not shown) distributed therethrough as a consequence of the foam added to the gypsum slurry during board manufacture. The overall average concentration of polyvinyl alcohol in the overall (total) core 20 (including regions 19 and 20) typically ranges from about 0.002 to about 0.04 wt % on a dry weight basis. Thus, because the polyvinyl alcohol is concentrated in the only those regions 19 and 21 of the core 20 where it is needed as a binder, even these relatively low quantities of polyvinyl alcohol in the core 20 are effective to provide adequate adhesion strength to the adjacent facer(s).

Because the binder is needed only at the interface of the core and facer(s), only a relatively thin coating of the polyvinyl alcohol-containing slurry needs to be applied to one or both of the webs 16 and 24. As a result of applying a thin coating, a higher concentration of polyvinyl alcohol is present at the surface of the facer(s), thereby improving the efficacy of polyvinyl alcohol as a binder. The present invention thereby avoids the need for using starch or other conventional binders. The gypsum core preferably is free or substantially free of starch.

The polyvinyl alcohol-containing regions 19 and 21 of the core typically have a higher density that the remaining portions of the core 20. The polyvinyl alcohol-containing regions 19 and 21 typically are about 35% to 60% more dense than the remaining portions of the core 20. This can be accomplished, for example, by providing a separate mixer for de-foaming the slurry that is applied as a thin coat to the facer sheet(s). The resulting board has hard edges having improved properties, such as nail-holding characteristics.

In a second embodiment of the present invention, polyvinyl alcohol is added to the aqueous gypsum slurry used to form the bulk gypsum core, e.g., as in the slurry applied via applicator 2 schematically illustrated in FIG. 1. In this embodiment, because the polyvinyl alcohol binder is contained throughout the core material, it generally is not necessary to add additional polyvinyl alcohol with the thin coating to the web(s) as in the first embodiment. Obviously, the use of the thin coating(s) itself in this embodiment would be optional. The amount of polyvinyl alcohol present in the gypsum slurry should be at least a minimum amount to promote adhesion between the set core and the paper and/or fibrous mat (preferably coated mat) facer sheets. Suitable exemplary amounts of polyvinyl alcohol in the slurry range from about 0.05 to about 0.4 wt %, more usually from about 0.1 to about 0.3 wt % on a dry weight basis. Suitable sources of polyvinyl alcohol for use in this embodiment include those described above.

It has been found that polyvinyl alcohol also can be an effective foaming agent for the core. Thus, it is possible to avoid not only the need for starch as a binder in the core, but also the need for soap or other conventional foaming agents, which can adversely effect adhesive strength between the core and the facer(s). Solutions of polyvinyl alcohol foam easily with mild agitation. Foaming can be accomplished using suitable foaming equipment and techniques well known to persons of ordinary skill in the art. The amount of polyvinyl alcohol needed for it to function as a foaming agent depends on such factors as the core density desired. In many applications, a somewhat higher amount of polyvinyl alcohol may be needed to obtain the desired core density than would be needed, for example, if the polyvinyl alcohol were only being used as a binder. By way of example, the amount of polyvinyl alcohol may be in the range described above as effective for adhesion promoting to as much as 0.6 or 0.8 wt % based on the dry weight of the core.

When fibrous mat and preferably coated fibrous mats are used, mat material typically is fed from a roll (not shown), and if coated, with the coated side down. Prior to receiving the gypsum slurry, the web of mat material typically is flattened by rollers (not shown) and preferably is scored by one or more scoring devices to allow the sides of mat material to be folded upward. The slurry at least partially (and preferably, only partially) penetrates into the thickness of the mat and then sets. On setting, a strong adhesive bond is formed between the set gypsum and the mat. The partial penetration of the slurry into the mat can be controlled according to methods known in the art such as, for example, controlling the viscosity of the slurry and by applying various coatings to the mat material. After the gypsum slurry is deposited upon the web of mat material, the edges of that web can be progressively folded (using equipment well-known to those skilled in the art) around the edges of the forming wallboard, and terminate on the upper surface of the slurry along the sides.

After being formed and sufficiently setting, the wallboard is typically cut to desired lengths and dried. Although not limited thereby, industrial drying conditions typically used in conventional continuous gypsum board manufacture also can be used in the manufacture of wallboard according to the present invention. Exemplary drying conditions include temperatures of about 200° to about 600° F., with drying times of about 30 to about 60 minutes, at line speeds of about 70 to about 600 linear feet per minute. After the initial preparation of the wallboard, separate water-resistant (or other) coatings can alternatively be applied to one, or both of the faces.

EXAMPLE 1

The following example illustrates preparing a gypsum board having a paper facer (tensile strength of 70 lbs./in.) and a pre-coated glass fiber mat facer in accordance with the present invention. The formulation set forth below is applied as a thin coating to the paper facer layer.

| Constituent | Lbs./1000 Square Ft. |
| --- | --- |
| Calcined Gypsum ($CaSO_4 \cdot 1/2\ H_2O$) | approx. 140 |
| Celvol ™ 203-24 (24% aqueous polyvinyl alcohol, 100% hydrolyzed) | 2.2 |
| Glass fiber | $\geq 4.3$ |
| Foaming Agent | $\leq 2.0$ |
| Potassium Sulfate (accelerator) | $\leq 1.5$ |
| Landplaster (accelerator) | as needed |
| Liquid Retarder | as needed |

The above formulation was applied to the paper facer. Additional aqueous gypsum slurry was thereafter applied to the coated paper facer to form the core of the board such that the total amount of calcined gypsum applied was about 1380 lbs./MSF. Continuous length board was prepared by sandwiching the coated paper facer and a pre-coated glass fiber mat facer using a conventional wall board machine. Edge paste (Akzo) was applied as needed to glue the edge portions of the paper facer to the edges of the coated mat. The board was cut into 8–12 foot lengths and thereafter the boards were placed in an oven having a temperature of about 400° F. for about 30 minutes until almost dry, and then at about 200° F. for about 15 minutes until dried completely.

The resulting board had an ASTM minimum caliper of 0.610" (UL minimum caliper of 0.595" across ends and 0.530" along taper). The dry weight of the board was 1648 lbs./MSF and its density ranged from about 36–50 lbs./ft$^3$. The board was tested for humidified deflection and humidified bond strength in accordance with conventional testing methods. The board had a humidified deflection of 0.167 inches. The humidified bond strength was 14.8 lb$_f$ (100%) for the paper facer and 21.2 lb$_f$ (63%) for the mat facer. The nail pull strength of the board was 88 lb$_f$. The gypsum board thus exhibited adequate adhesion strength without the need for starch in the core.

EXAMPLE 2

This example illustrates preparing gypsum boards having a set gypsum core adhered to a paper facer (tensile strength of 70 lbs./in.). In Examples 2A and 2B, polyvinyl alcohol was used in the slurry used to prepare the gypsum core. Example 2C is a control in which polyvinyl alcohol was not used, and in which starch and soap were both used in the slurry.

| Example | 2A (lbs./MSF) | 2B (lbs./MSF) | 2C (lbs./MSF) |
|---|---|---|---|
| Dry Board Weight | 1300 | 1300 | 1595 |
| Calcined Gypsum (CaSO$_4$ · 1/2 H$_2$O) | 1002 | 1004 | 1260 |
| Celvol ™ 203-24 (24% aqueous PVA 100% hydrolyzed) | 6.75 | 3.75 | 0 |
| Soap | 0 | 0.32 | 0.32 |
| Starch | 0 | 0 | 5 |
| Dispersant | 3.11 | 3.11 | 3.11 |
| Potash (Accelerator) | 1.32 | 1.32 | 1.32 |
| BMA | 6.12 | 6.12 | 6.12 |
| Paper Pulp | 4 | 4 | 4 |
| Boric Acid | 0.5 | 0.5 | 0.5 |
| Retarder | 0.28 | 0.28 | 0.28 |

Figure 3:
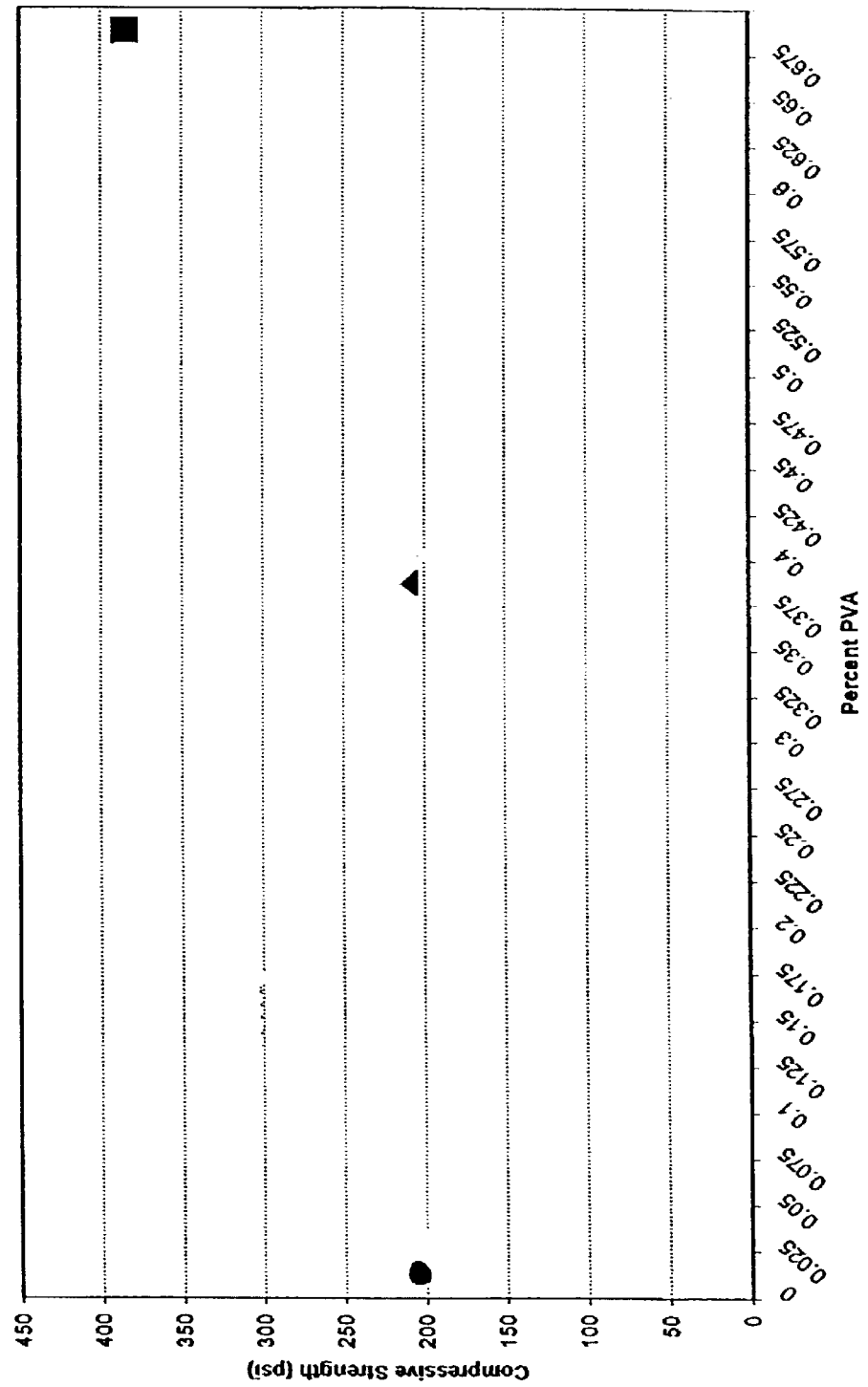
FIG. 3 is a graphical representation of compressive strength as a function of the concentration of polyvinyl alcohol in the core of a gypsum board in accordance with another embodiment of the invention.

FIG. 3 graphically illustrates the effect polyvinyl alcohol has on compressive strength of the gypsum boards. The board of Example 2A (represented in FIG. 3 by the filled square) exhibited the highest compressive strength and had a density of 33.5 lbs./ft$^3$ at a water-to-plaster (w/p) weight ratio of 90/1. The board of Example 2B, in which soap was used in the core (represented in FIG. 3 by the filled triangle), had a density of 31.5 lbs./ft$^3$ at a 90/1 w/p weight ratio. The board of Example 2C, which used both starch and soap in the core (represented in FIG. 3 by the filled circle), had a density 32 lbs./ft$^3$ at a 90/1 w/p weight ratio. This demonstrates that polyvinyl alcohol can provide adequate strength without the need for starch (e.g., Example 2B), and that polyvinyl alcohol also can be used as a foaming agent in lieu of soap (e.g., Example 2A).

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

We claim:

1. A process of preparing gypsum board having a set gypsum core and at least one facer sheet adhered to the core, the process comprising:

providing a facer sheet;

applying to a first side of the facer sheet a first aqueous slurry of calcined gypsum containing an adhesion promoting effective amount of polyvinyl alcohol;

applying a second aqueous slurry of calcined gypsum which is substantially free of polyvinyl alcohol to the facer sheet to form a major portion of the core;

shaping the second aqueous slurry of calcined gypsum to form a wet board; and drying the wet board to form the gypsum board having the at least one facer sheet adhered to the set gypsum core.

2. The process of claim 1, wherein the set gypsum core is substantially free of starch.

3. The process of claim 1, wherein the facer sheet is a paper facer sheet.

4. The process of claim 1, wherein the facer sheet is a fibrous mat.

5. The process of claim 1 wherein the polyvinyl alcohol is present in said first aqueous slurry in an amount from about 0.05 to about 0.4 wt % on a dry weight basis.

6. A process of preparing gypsum board having a set gypsum core and two facer sheets adhered to the core, the process comprising:

providing a first facer sheet;

applying to a first side of the first facer sheet a first aqueous slurry of calcined gypsum containing an adhesion promoting effective amount of polyvinyl alcohol;

providing a second facer sheet;

applying to a first side of the second facer sheet a second aqueous slurry of calcined gypsum containing an adhesion promoting effective amount of polyvinyl alcohol;

applying a third aqueous slurry of calcined gypsum which is substantially free of polyvinyl alcohol to the first facer sheet or the second facer sheet to form a major portion of the core;

shaping the third aqueous slurry of calcined gypsum and joining the first and second facer sheets having the third aqueous slurry of calcined gypsum therebetween, to form a wet board; and drying the wet board to form the gypsum board having the two facer sheets adhered to the set gypsum core.

7. The process of claim 6, wherein each of the first facer sheet and the second facer sheet is a paper facer sheet.

8. The process of claim 6, wherein one of the first facer sheet and the second facer sheet is a paper facer sheet and the other is a fibrous mat.

9. The process of claim 6, wherein each of the first facer sheet and the second facer sheet is a fibrous mat.

10. The process of claim 6 wherein the polyvinyl alcohol is present in each of the first and second aqueous slurries in an amount from about 0.05 to about 0.4 wt % on a dry weight basis.

11. Gypsum board comprising a set gypsum core containing an adhesion promoting effective amount of polyvinyl alcohol, and at least one facer sheet adhered to the set gypsum core, wherein the polyvinyl alcohol is concentrated in at least one region of the set gypsum core adjacent to the at least one facer sheet and wherein the set gypsum core outside of said at least one region is substantially free of polyvinyl alcohol.

12. The gypsum board of claim 11 which has a first facer sheet and a second facer sheet, wherein each of the first facer sheet and the second facer sheet is a paper facer sheet.

13. The gypsum board of claim 11 which has a first facer sheet and a second facer sheet, wherein one of the first facer sheet and the second facer sheet is a paper facer sheet and the other is a fibrous mat.

14. The gypsum board of claim 11 which has a first facer sheet and a second facer sheet, wherein each of the first facer sheet and the second facer sheet is a fibrous mat.

15. The gypsum board of claim 11, wherein the polyvinyl alcohol is present in the set gypsum core in an average concentration of from about 0.002 to about 0.04 wt % on a dry weight basis.

16. The gypsum board of claim 11 wherein the set gypsum core is substantially free of starch.

17. The gypsum board of claim 11 wherein said at least one polyvinyl alcohol-containing region comprises about 3 to 11% by weight of the overall gypsum core.

18. Gypsum board comprising a set gypsum core containing an adhesion promoting effective amount of polyvinyl alcohol, and at least one paper facer sheet adhered to the set gypsum core, wherein the set gypsum core is substantially free of starch.

19. The gypsum board of claim 18, wherein the polyvinyl alcohol is concentrated in at least one region of the set gypsum core adjacent to the at least one paper facer sheet, and wherein the polyvinyl alcohol is present in the set gypsum core in an average concentration of from about 0.002 to about 0.04 wt % on a dry weight basis.

20. The gypsum board of claim 19, wherein the set gypsum core outside of said at least one region is substantially free of polyvinyl alcohol.

21. The gypsum board of claim 18, wherein the polyvinyl alcohol is present substantially throughout the set gypsum core in a concentration of from about 0.05 to about 0.8 wt % on a dry weight basis.

22. The gypsum board of claim 21, wherein the concentration of polyvinyl alcohol is from about 0.1 to about 0.6 wt % on a dry weight basis.

23. The gypsum board of claim 18, wherein said at least one polyvinyl alcohol-containing region comprises about 3 to 11% by weight of the overall gypsum core.

* * * * *